United States Patent
Ball, Jr. et al.

(10) Patent No.: US 8,601,821 B2
(45) Date of Patent: Dec. 10, 2013

(54) METHOD AND APPARATUS FOR SUPPLYING PRESSURE FOR SPRAY INLET TEMPERATURE SUPPRESSOR OF GAS TURBINES

(75) Inventors: David Wesley Ball, Jr., Easley, SC (US); Leroy Omar Tomlinson, Schenectady, NY (US); Douglas Frank Beadie, Greer, SC (US)

(73) Assignee: General Electric Company, Schenectady, NY (US)

( * ) Notice: Subject to any disclaimer, the term of this patent is extended or adjusted under 35 U.S.C. 154(b) by 484 days.

(21) Appl. No.: 11/834,958

(22) Filed: Aug. 7, 2007

(65) Prior Publication Data

US 2009/0038313 A1 Feb. 12, 2009

(51) Int. Cl.
*F02C 1/00* (2006.01)

(52) U.S. Cl.
USPC ............................. 60/772; 60/39.182; 60/775

(58) Field of Classification Search
USPC ................... 60/39.182, 39.3, 39.59, 772, 775
See application file for complete search history.

(56) References Cited

U.S. PATENT DOCUMENTS

| | | | | |
|---|---|---|---|---|
| 4,537,023 A | * | 8/1985 | Nakamura et al. | 60/775 |
| 6,389,799 B1 | * | 5/2002 | Hatamiya et al. | 60/39.3 |
| 6,446,440 B1 | * | 9/2002 | Ranasinghe et al. | 60/775 |
| 6,901,736 B2 | * | 6/2005 | Hatamiya et al. | 60/39.53 |
| 2001/0027642 A1 | * | 10/2001 | Tsuji | 60/39.182 |
| 2002/0066265 A1 | * | 6/2002 | Tsuji | 60/39.182 |
| 2003/0196439 A1 | * | 10/2003 | Utamura | 60/775 |
| 2004/0060277 A1 | * | 4/2004 | Hatamiya et al. | 60/39.53 |
| 2005/0102995 A1 | | 5/2005 | Carberg et al. | |
| 2006/0254283 A1 | * | 11/2006 | Savic et al. | 60/775 |

FOREIGN PATENT DOCUMENTS

| | | | |
|---|---|---|---|
| JP | 63248931 A | 10/1988 | |
| JP | 2001214754 A | 8/2001 | |
| JP | 2001214757 A | 8/2001 | |
| WO | 0025009 A1 | 5/2000 | |

OTHER PUBLICATIONS

Stork Thermeq; "SwirlFlash—The Power of Water, Gas turbine power augmentation and NOx reduction". 6 pages.
JP Office Action dated Nov. 6, 2012 from corresponding Application No. 2008-202528 along with unofficial English translation.

* cited by examiner

*Primary Examiner* — Phutthiwat Wongwian
(74) *Attorney, Agent, or Firm* — Cantor Colburn LLP

(57) ABSTRACT

An apparatus for supplying water to a misting system for an inlet of a gas turbine, includes a diversion of heated feedwater from a loop and to a pump, the pump providing high-pressure feedwater to the misting system. A combined cycle power plant is provided.

11 Claims, 6 Drawing Sheets

METHOD AND APPARATUS FOR SUPPLYING PRESSURE FOR SPRAY INLET TEMPERATURE SUPPRESSOR OF GAS TURBINES

BACKGROUND OF INVENTION

1. Field of the Invention

The present invention relates to gas turbines, and in particular, the invention relates to use of boiler feedwater for Gas Turbine inlet air temperature control.

2. Description of the Related Art

It is well known in gas turbine operation, that turbine output decreases in proportion to increases in ambient air temperature. However, gas turbine operators frequently encounter peak power generating requirements at elevated ambient temperatures (e.g., due to high air conditioning loads in major cities). It is economical and advantageous to generate additional power through auxiliary systems during those peak power demand periods. One auxiliary system for increasing power input is an inlet misting or fogging system which provides a direct spray of water into the inlet duct which, through an evaporative process, lowers the air temperature to the gas turbine and, hence, increases output.

Compressor inlet misting systems generally attempt to match the spray of water into the inlet duct to the evaporation potential of the air flowing to the gas turbine. Since ambient temperature conditions are variable, a variable spray of water and substantial turndown of the water spray are required. Existing misting systems employ multiple grids each having a substantial number of nozzles to spray the water into the inlet duct. However, as the water supply is turned down, the spray pattern in the inlet duct becomes much less uniform, resulting in less evaporation and more water carryover. Water carryover (i.e., large droplets of water) entering the compressor have potential to erode the initial compressor stage. Additionally, the air flow is disrupted by the nozzles and ancillary piping in the inlet duct, resulting in reduced evaporation. These disruptions often disadvantageously form vortices in the flow downstream of the manifold tubes. Consequently, there has been a need for a misting system which would provide a substantially uniform water spray into the gas turbine compressor at lower than full demand conditions with minimal obstruction to flow and generation of vortices.

One attempt to address this need is disclosed in U.S. Patent Application No. 2005/0102995, entitled "Spray nozzle grid configuration for gas turbine inlet misting system," published May 19, 2005. This application discloses a mister that includes a plurality of manifolds extending between opposite sides of a duct. Each manifold carries a plurality of nozzles at laterally spaced positions along the length of the manifold. The manifolds are spaced one behind the other in the direction of air flow in the duct and the pipes connecting the nozzles of the intermediate and upstream manifolds bypass the downstream manifolds to provide the nozzles in a common plane perpendicular to the direction of air flow in the duct. This arrangement affords a uniformity of spray and, hence, a uniformity of humidified air to the inlet of the compressor. Although the teachings therein provide many advantages, certain disadvantages of the prior art remain. For example, the use of a separate high-pressure pumping system is costly and in some embodiments, unreliable.

What are needed are methods and apparatus for providing cost efficient and reliable sources of high-pressure water to a gas turbine, such as those disclosed herein.

BRIEF DESCRIPTION OF THE INVENTION

In one embodiment, disclosed is an apparatus for supplying water to a misting system for an inlet of a gas turbine, the apparatus including: a diversion of heated feedwater from a loop and to a pump, the pump providing high-pressure feedwater to the misting system.

Also disclosed is an embodiment of a combined cycle power plant, including: a loop for heating feedwater by transfer of heat from exhaust of a gas turbine, a diversion of the heated feedwater from the loop and a pump for receiving the heated feedwater and providing high-pressure feedwater to a misting system for providing a mist to an inlet of the gas turbine.

Further disclosed is an embodiment of a method for providing water to a misting system of a gas turbine, the method including: diverting feedwater to a pump; pressurizing the feedwater; and providing high-pressure feedwater to the misting system.

DETAILED DESCRIPTION OF THE INVENTION

Disclosed are methods and apparatus for providing high-pressure water to a gas turbine of a combined cycle power plant. The teachings herein replace prior art pump skids and the associated components. The elimination of the pumping skid provides improved system reliability and operational characteristics. For perspective, aspects of a combined cycle power plant and a prior art misting system for a gas turbine are now discussed.

Figure 1:
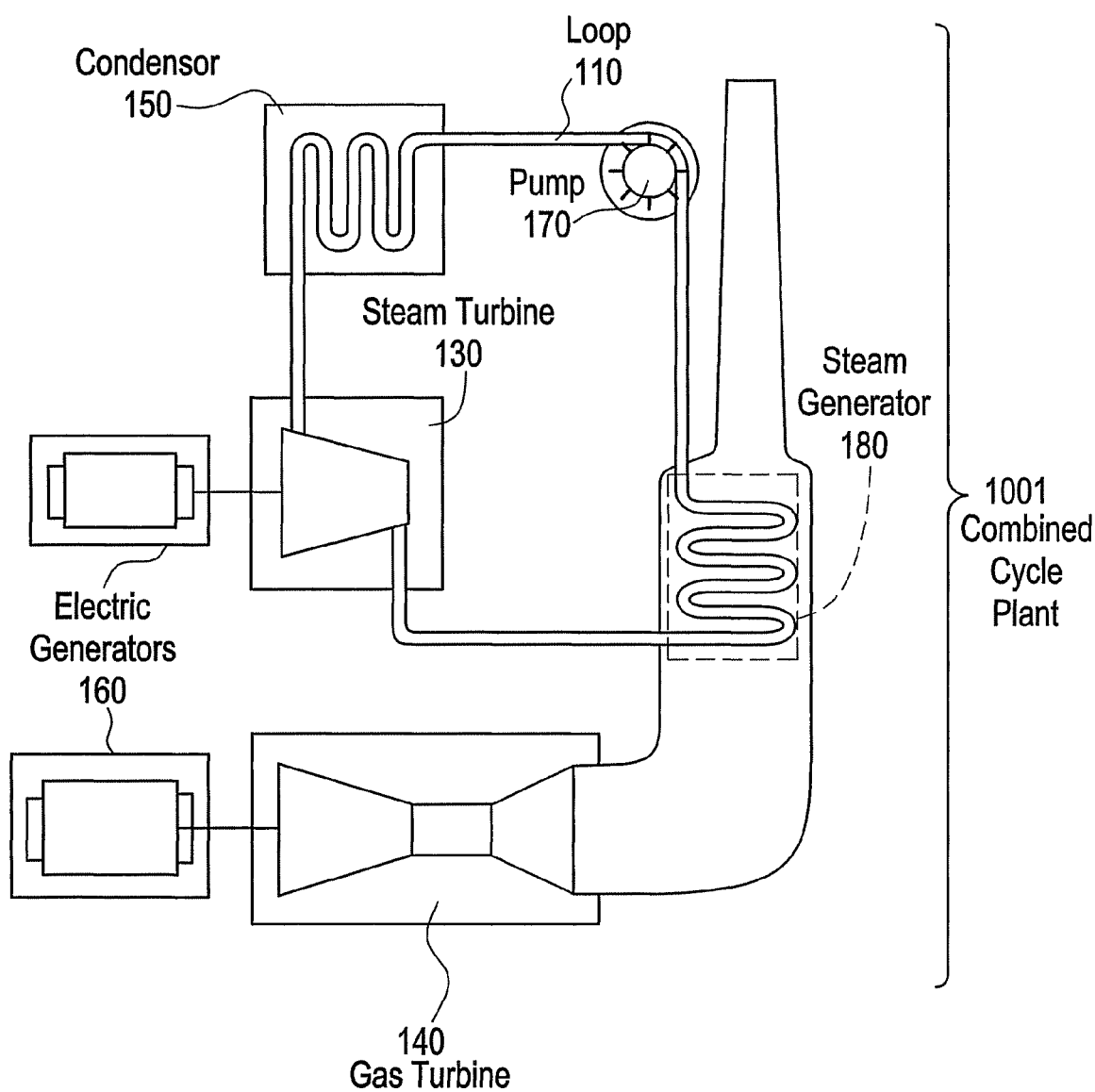
FIG. 1 depicts aspects of a combined cycle power plant.

Referring to FIG. 1, there are shown exemplary aspects of a prior art combined cycle power plant 1001. The power plant 1001 includes a gas turbine 140, two electric generators 160, a steam turbine 130, a condenser 150; a feedwater pump 170 and a steam generator 180. In operation, the gas turbine 140 is used as a direct drive to one of the electric generators 160. In addition, exhaust from the gas turbine 140 heats feedwater and makes superheated steam. The superheated steam is directed to the steam turbine 130 to drive one of the electric generators 160. The superheated steam sent to the steam turbine 130 is typically of high pressure and temperature. For example, in some embodiments, pressure of the feedwater is between about 2,600 psig and about 2,800 psig, while temperature of the feedwater is between about 300° F. and about 320° F.

It may be recognized that the combined cycle power plant 1001 provides power by turning a first generator 160 with mechanical energy from the gas turbine 140 and also by turning a second generator 160 with mechanical energy derived from a steam turbine 130.

Figure 2:
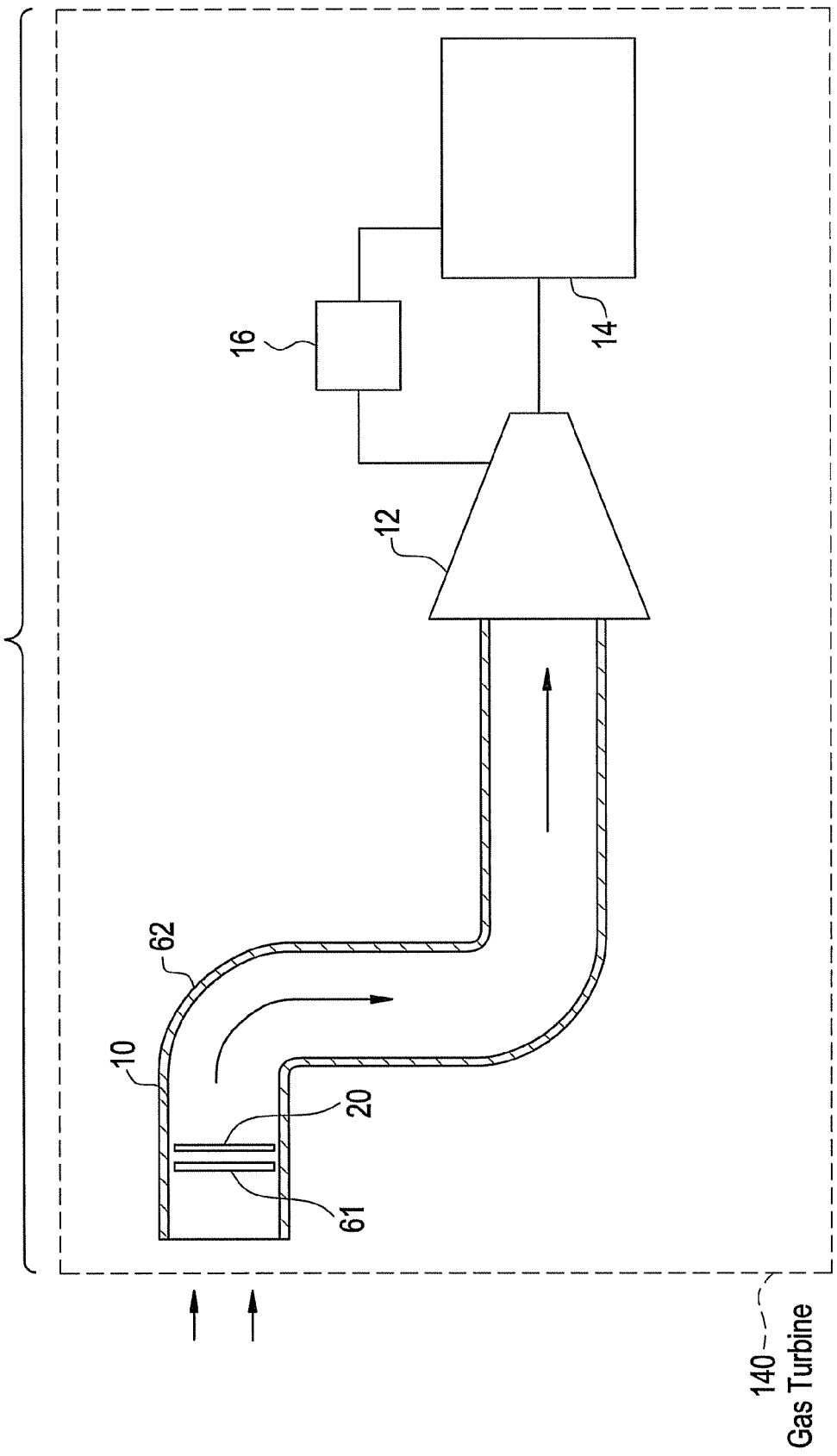
FIG. 2 depicts aspects of a prior art mister arranged in an air inlet duct to a compressor for a turbine.

Referring to FIG. 2, there is illustrated an exemplary embodiment of a prior art misting system 99. The prior art system 99 is generally incorporated into the gas turbine 140. In this example, the system 99 includes an inlet duct 10 for supplying ambient air to the inlet of a compressor 12 driven by a turbine 14. As noted previously, gas turbine output decreases in proportion to increase in the ambient air temperature and, accordingly, a mister apparatus, generally designated 20, is disposed in the inlet duct 10 to provide a direct water spray evaporative cooling system, thereby to increase output of the gas turbine 140.

Figure 3:
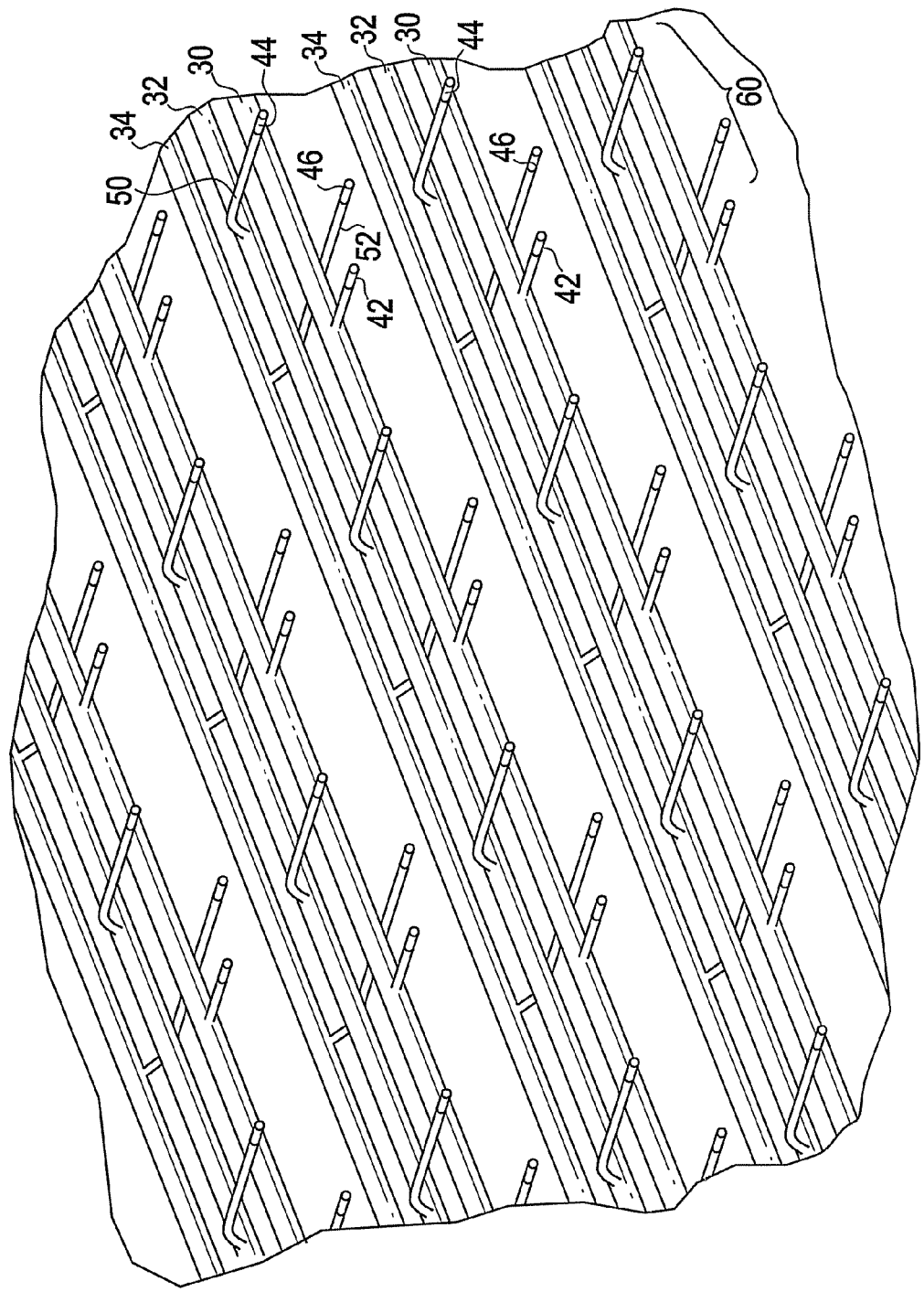
FIG. 3 and FIG. 4 depict aspects of the mister arrangement of FIG. 2.
Figure 4:
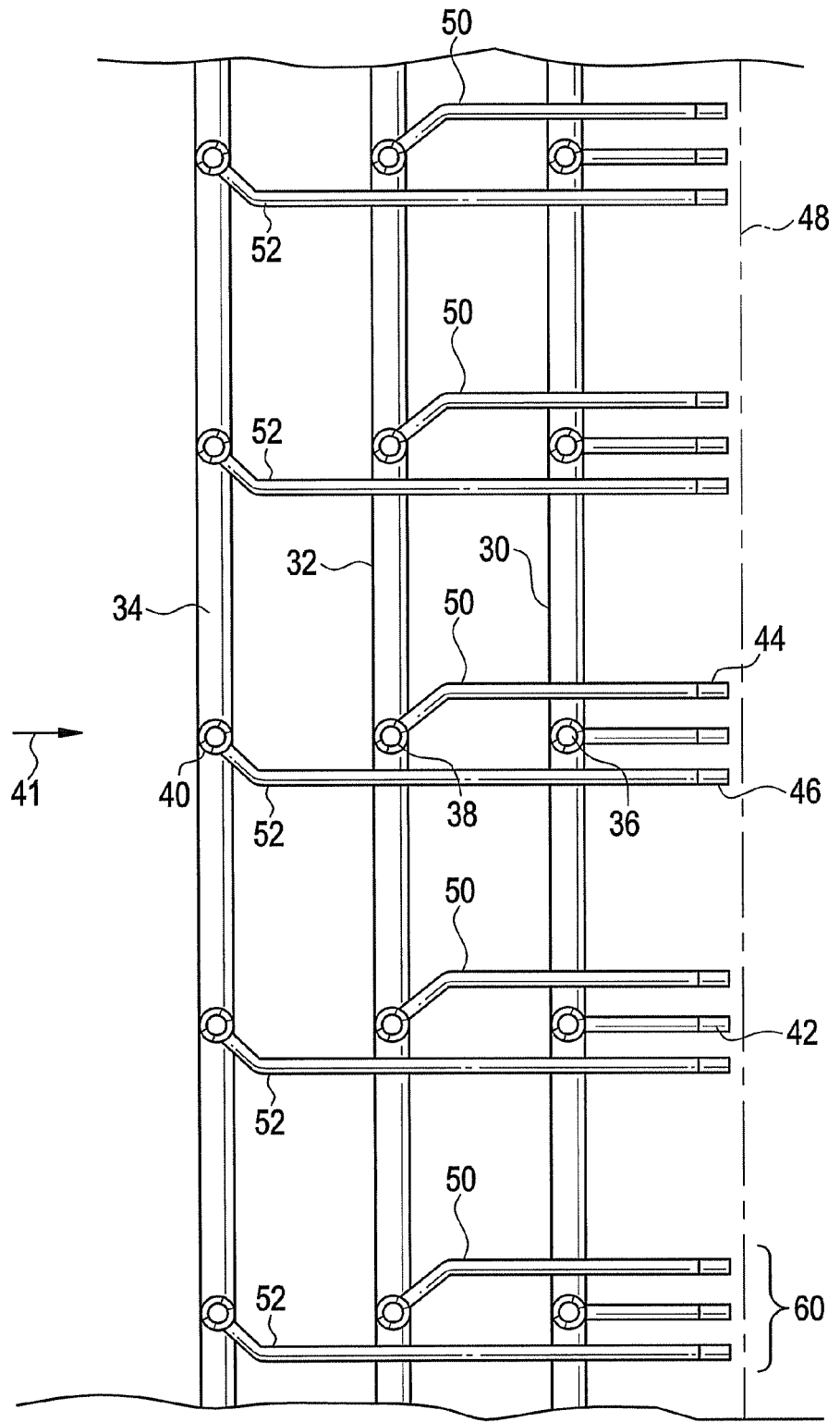

Referring now to FIGS. 3 and 4, the prior art mister apparatus includes an array of nozzles for spraying water in the duct 10 for evaporation and humidification of the air inlet to the compressor 12. As illustrated in FIG. 4, a series of headers 30, 32 and 34 along one or both sides of the duct supply water to a series of manifolds 36, 38 and 40, extending from the headers and generally laterally between opposite side walls of the duct. Thus, as illustrated, a first set of laterally extending manifolds 36 vertically spaced one from the other extends between opposite walls of the duct on a downstream side of the mister. A second set of laterally extending manifolds 38 are vertically spaced one from the other and likewise extend between opposite sides of the duct. The second set of manifolds 38 are disposed between the downstream manifolds 36 and a third set of upstream manifolds 40. Upstream manifolds 40 extend laterally and are spaced vertically one from the other between opposite sides of the duct. The direction of air flow through the duct is illustrated by the arrow designated 41.

Each of the manifolds 36, 38, 40 includes a plurality of nozzles. For example, the first or downstream manifolds 36 each carry a plurality of nozzles 42 which extend from the manifold in a downstream direction parallel to the direction of the air flow. Similarly, each of the intermediate or second manifolds 38 carry a plurality of nozzles 44 at laterally spaced locations and which nozzles 44 likewise extend from the manifold in a downstream direction and in the direction of the air flow. The upstream or third manifolds 40 likewise carry a plurality of nozzles 46 at spaced lateral positions there along and which nozzles 46 extend in a downstream direction in the direction of air flow. The nozzles 42, 44 and 46 thus constitute first, second and third sets, respectively, of plural nozzles extending in a downstream direction from respective manifolds 36, 38 and 40. As illustrated in FIG. 3, the nozzles 42, 44 and 46 terminate substantially in a common plane designated 48 extending across the duct and generally perpendicular to the direction of air flow through the duct 10.

As illustrated in both FIGS. 3 and 4, the nozzles 44 are carried by pipes 50 from the respective manifolds 38 which pipes 50 are vertically offset from the downstream manifolds 36. Likewise, the nozzles 46 of the upstream manifolds 34 are carried by pipes 52 which extend along the vertically opposite sides of the intermediate and downstream manifolds 38 and 36, respectively, enabling the nozzles 42, 44 and 46 to lie in the common plane 48. It will be appreciated that the nozzles 42, 44 and 46 have a spray plume (e.g., a conical plume). With the arrangement of the nozzles as described, it will also be appreciated that the spray plumes do not interfere with one another and are not interfered by either the adjacent nozzles or manifolds.

From a review of FIGS. 3 and 4, the nozzles 42, 44 and 46 are preferably arranged in groups of three nozzles each, with the groups thereof being spaced from one another across the duct 10 between its opposite side walls. The nozzles 42 and 44 are spaced equal distances from the center nozzle 46 of each group. Groups 60 of three nozzles each are spaced laterally in the direction of the manifolds from one another a distance from centerline to centerline of the groups at least and preferably four times the distance between laterally adjacent nozzles of each group. That is, as illustrated in FIG. 3, the distance along the manifolds between the center nozzles 46 of adjacent groups is at least four times the distance along the manifolds between the nozzles 42, 46 or 44, 46 of each group. The groups 60 of nozzles 42, 44 and 46 are also preferably in vertical registration with one another although such vertically spaced groups of nozzles may be laterally offset. In this manner, the groups of nozzles are spaced relative to one another to provide a substantially uniform distribution of water in the air inlet duct and without forming vortices resulting from interference between the nozzle spray plumes and adjacent nozzles or the manifolds.

Referring back to FIG. 2, the mister apparatus 20 is typically located in the portion of the inlet housing which corresponds to the location of the most uniform air flow within the duct 10. It has been found that by locating an extra length of inlet duct between the silencer 61 and the elbow 62 or downcomer to the turbine, that a substantial uniformity of flow can be obtained. By locating the mister apparatus in the area of uniform flow, a uniformity of humidified flow is likewise obtained. It will also be appreciated that the number of nozzles in a mister apparatus may, for example, comprise on the order of nine hundred or more nozzles in a single grid. Additionally, the nozzles may be of a swirl type where the nozzle plume is not only conical in shape but swirls about an axis generally parallel to the direction of flow through the duct.

The prior art system 99 described with regard to FIG. 2 through FIG. 4 was originally designed as an alternative to a media-type evaporative cooler and provides certain advantages over media-type evaporative coolers. In operation, the prior art system provides demineralized water to a spray manifold located in the inlet ducting immediately downstream of the inlet bleed heat pipes. The function of the prior art system 99 is to lower the inlet dry bulb temperature of the air entering the gas turbine compressor through the evaporation of fine water droplets. The resulting increase in air density and the increase in the air mass flow to the gas turbine 140 results in increased power output from the gas turbine 140. The prior art system 99 schedules water flow to the spray manifold as a function of compressor airflow, ambient dry bulb temperature, ambient relative humidity, and the desired approach to saturation. Included in various embodiments of the prior art system 99 are certain components of note. These components include a high-pressure pumping skid, which includes the high-pressure water pumps, filters, isolation valves and flow-meters; a plurality of spray nozzle arrays mounted inside the inlet duct; a water delivery system, which is a set of interconnecting piping between the pump slid and spray nozzle arrays; provisions for a fogger which include an inlet duct section downstream of a silencer section, access, windows etc.; a plurality of gutters and a false inlet plenum floor; a weather station; various controls; and a drain system. It should be recognized that these components mentioned are merely illustrative of those included in a gas turbine 140, and that this list of components is neither limiting nor exhaustive. The invention provided herein eliminates the need for a pump skid by using high-pressure boiler feedwater.

The pump skid of the prior art typically includes a four high-pressure positive displacement plunger pumps with constant speed motors. The pump skid is usually provided as a complete stand-alone system with automatic start, stop, and alarms. The pump skid of the prior art usually receives demineralized water from a water treatment facility and delivers filtered, high-pressure water at the required flow rate to meet the applicable inlet cooling condition requirement at any designed operating condition.

The use of the high-pressure boiler feed-water eliminates the need for the pumping skid. The elimination of the pumping slid provides improved system reliability and operation.

Figure 5:
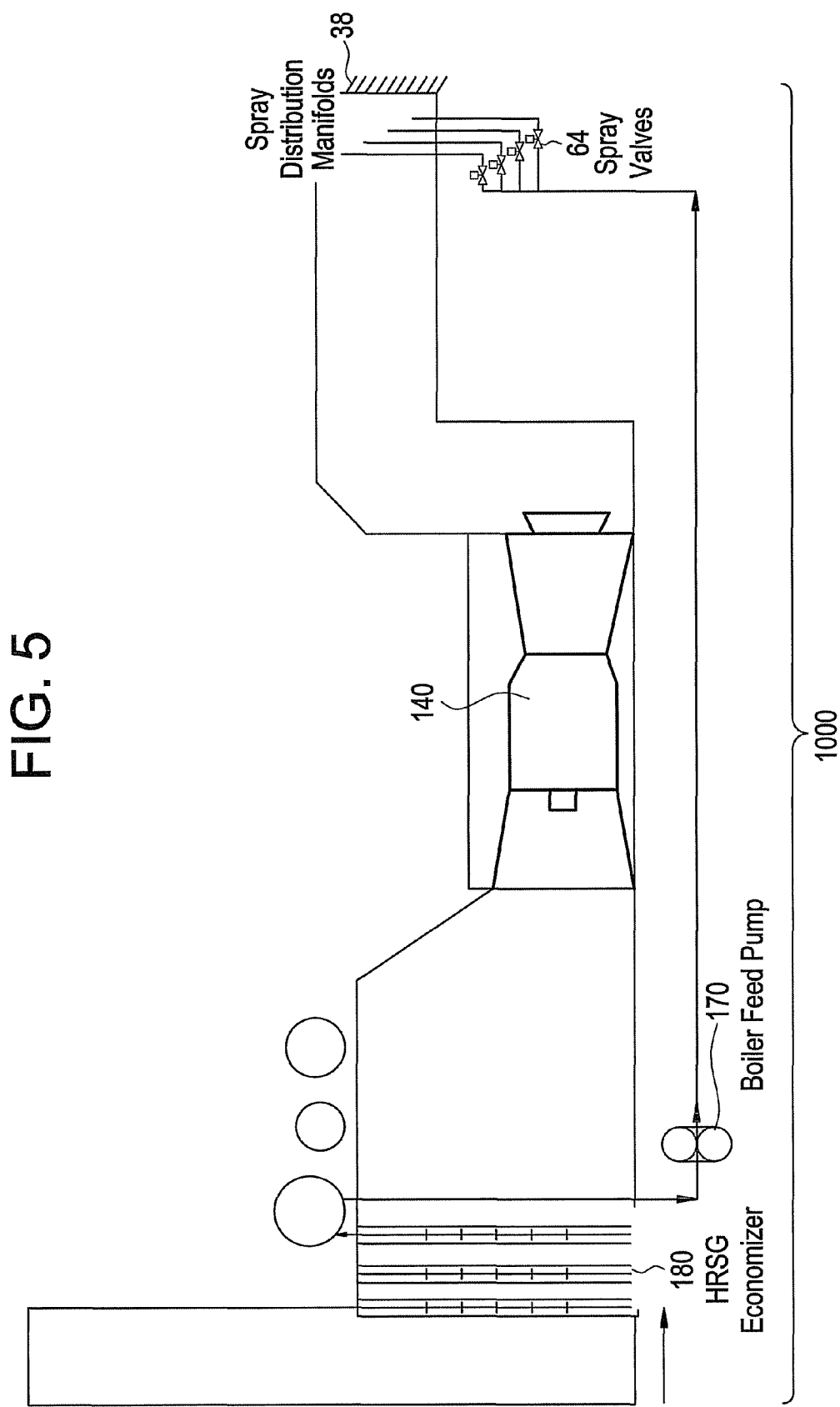
FIG. 5 is a schematic diagram depicting aspects of a temperature apparatus according to the teachings herein.

Referring now to FIG. 5, there is shown a schematic diagram of an exemplary feedwater temperature suppression system 1000 according to the teachings herein. The feedwater temperature suppression system 1000 makes use of the gas turbine 140 and the boiler feedwater pump 170. That is, some of the feedwater heated by exhaust of the gas turbine 140 is diverted and pressurized by the feedwater pump 170. Accordingly, the boiler feedwater pump 170 supplies high-pressure boiler feedwater to spray valves 64 and the spray distribution manifolds 38 for distribution by the nozzles 42, 44, 46. Accordingly, the boiler feedwater pump 10 of FIG. 5 may be referred to as being "directly" connected to, or receiving feedwater "directly" from the steam generator 180, inasmuch as feedwater is provided to the boiler feedwater pump 170 from the steam generator 180 without requiring additional heating elements or pressurizing elements between the steam generator 180 and the boiler feedwater pump 170.

Various pump skid designs have been provided in an attempt to dampen pressure pulsations from the piston pumps, capture pump seal shedding (normal wear) that are a cause of system failure (such as by addition of filtration), and to provide for increased system reliability and reduced system maintenance by redesign or relocation pump re-circulation equipment. However, these efforts still fall short of what is desired by operators of temperature suppression systems.

The feedwater temperature suppression system 1000 eliminates the need for a separate high-pressure pumping system. An additional advantage of the feedwater temperature suppression system 1000 is the use of hot water, which provides for improved inlet fogging.

That is, by providing water having a high pressure and high temperature (e.g., where the pressure is between about 800 psig and about 3,000 psig, and more often between about 2,600 psig and about 2,800 psig and the temperature is between about 240° F. and about 320° F., and more often between about 300° F. and about 320° F.), the water rapidly disperses (as steam) when sprayed by the nozzles 42, 44, 46. Accordingly, the nozzles 42, 44, 46 may incorporate design elements to improve distribution of the high pressure feedwater.

By eliminating the separate pumping system, maintenance and operating cost are reduced. Further, there is no additional load on the high-pressure boiler feed-water pump 101 during the operation of the feedwater temperature suppression system 1000. Accordingly, a substantial cost savings is realized over prior art designs.

Figure 6:
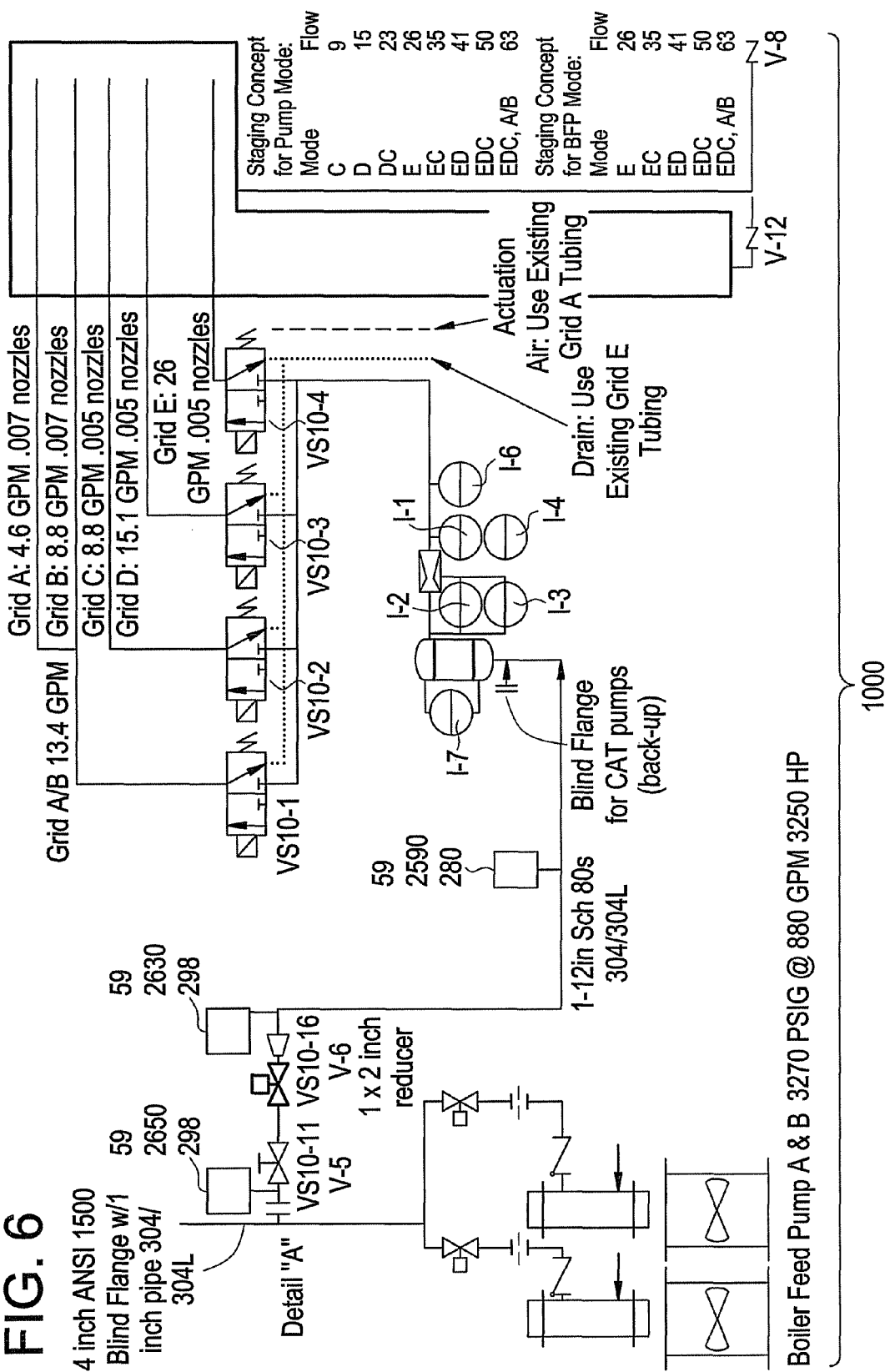
FIG. 6 is a schematic diagram depicting aspects of a pressure supply for the apparatus of FIG. 5.

Referring now to FIG. 6, a schematic diagram of an exemplary embodiment is provided. In this example, the feedwater temperature suppression system 1000 includes modifications over the prior art, including: an addition of an inline filter; an addition of various isolation valves; a revision of control logic for system start up and drain down; an update to the drain system; and, replacement of grid nozzle arrays with nozzles that do not include filters. Various manifolds are included, and some may be redesigned. For example, the feedwater temperature suppression system 1000 may include prior art systems, such as a backup system or for flow augmentation.

In some embodiments, the high-pressure feedwater is supplied only when the gas turbine 140 is fully operational (i.e., when the pressure is between about 2,600 psig and about 2,800 psig and the temperature is between about 300° F. and about 320° F.). However, it is recognized that one may wish to provide lower pressure or temperature feedwater, such as during power ascension of the combined cycle power plant 1001 or during low power operation. Such provisioning is within the teachings herein.

In some embodiments, the feedwater temperature suppression system 1000 draws about seventy (70) gallons per minute (gpm) of the flow of the feedwater. In a typical combined cycle power plant 1001, flow is in excess of 2,000 gpm. Accordingly, in some embodiments, no additional makeup water is needed. That is, the diversion of some of the feedwater does not present a significant loss to the feedwater for the combined cycle power plant 1001 and existing makeup water systems compensate adequately for the usage. In some other embodiments, diversion of the high-pressure feedwater is monitored and factored into a supply of makeup water. That is, apparatus for at least one of monitoring a volume of feedwater in the diversion and providing additional makeup water may be included.

One skilled in the art will surmise that the feedwater temperature suppression system 1000 may be incorporated into a variety of embodiments of apparatus useful for providing humidified air to an inlet of a compressor. Accordingly, the spray nozzle configuration and other aspects presented herein are merely illustrative of techniques for making use of the feedwater temperature suppression system 1000. The spray nozzle configuration and other aspects presented herein are merely illustrative and are not limiting of the invention.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for supplying water to a misting system for an inlet of a gas turbine, the apparatus comprising:
    a heat recovery steam generator couples to an output line, the heat recovery steam generator operative to receive feedwater and heat the feedwater; and
    a feed pump directly connected to the output line to receive the heated feedwater directly from the heat recovery steam generator and output high-pressure heated feedwater to the misting system of the inlet of the gas turbine.

2. The apparatus as in claim 1, wherein the feedwater is heated by an exhaust of the gas turbine.

3. The apparatus as in claim 1, wherein the high-pressure feedwater comprises a pressure of between about 800 psig and about 3,000 psig.

4. The apparatus as in claim 1, wherein the high-pressure feedwater comprises a temperature of between about 240° F. and about 320° F.

5. A combined cycle power plant, comprising:
    a loop having a diversion line couples to a heat recovery steam generator for heating feedwater by transfer of heat from exhaust of a gas turbine, and a pump directly connected to the diversion line for receiving the heated feedwater directly from the diversion line and providing high-pressure heated feedwater to a misting system for providing a mist to an inlet of the gas turbine.

6. The power plant as in claim 5, further comprising a pump skid coupled to the misting system for at least one of backing up and augmenting a supply of the high-pressure feedwater.

7. The power plant as in claim 5, wherein nozzles of the misting system do not include filters.

8. The power plant as in claim 5, wherein a makeup water system provides an adequate supply of water to account for a volume of feedwater in the diversion.

9. The power plant as in claim 5, further comprising apparatus for at least one of monitoring a volume of feedwater in the diversion and providing additional makeup water.

10. A method for providing water to a misting system at an inlet of a gas turbine having a heat recovery steam generator couples to an output line, and a feed pump directly connected to the output line, the method comprising:
- heating the feed water supply to the heat recovery steam generator;
- diverting the feedwater a the feed pump;
- pressurizing the heated feedwater; and
- providing high-pressure heated feedwater to the misting system.

11. The method as in claim 10, wherein heating the feedwater comprises transferring heat from exhaust gases of the gas turbine to the feedwater.

* * * * *